W. F. WAHRENBERGER.
WHEEL CARRIER FOR DEMOUNTABLE WHEELS.
APPLICATION FILED SEPT. 17, 1918.

1,297,942.

Patented Mar. 18, 1919.

WITNESSES

INVENTOR
W. F. Wahrenberger
BY
ATTORNEYS

UNITED STATES PATENT OFFICE.

WILLIAM FREDRICK WAHRENBERGER, OF NEW YORK, N. Y.

WHEEL-CARRIER FOR DEMOUNTABLE WHEELS.

1,297,942.   Specification of Letters Patent.   Patented Mar. 18, 1919.

Application filed September 17, 1918. Serial No. 254,439.

*To all whom it may concern:*

Be it known that I, WILLIAM F. WAHRENBERGER, a citizen of the United States, and a resident of the city of New York, City Island, borough of the Bronx, in the county of Bronx and State of New York, have invented new and Improved Wheel-Carriers for Demountable Wheels, of which the following is a full, clear, and exact description.

Among the principal objects which the present invention has in view are: to provide a support for spare wheels on automobiles and particularly on the automobiles of the type known as "Ford"; and to simplify the construction.

*Drawings.*

*Description.*

Figure 1:
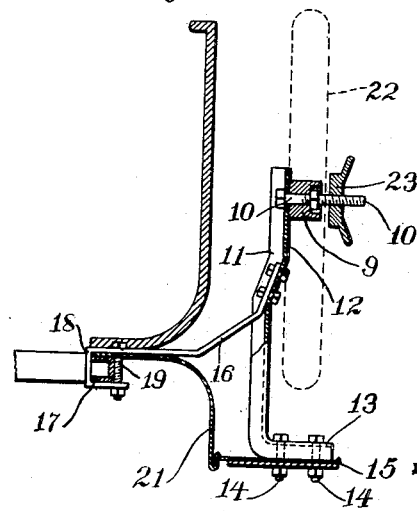
Figure 1 is a vertical section of a running board shield and body, and a carrier fixture constructed and arranged in accordance with the present invention, the section being taken as on the line 1—1 of Fig. 2.
Figure 2:
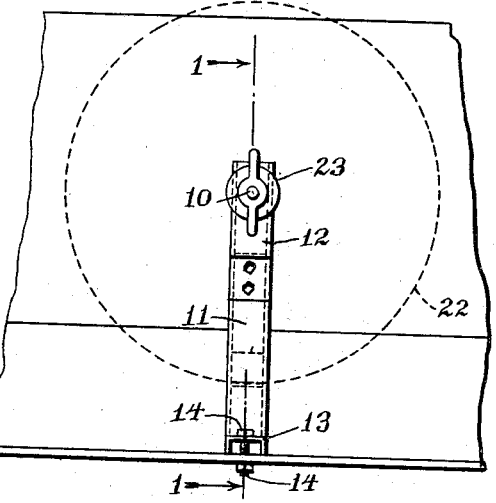
Fig. 2 is a side view of a fragment of the running board shield and body of an automobile, a carried wheel being indicated thereon by dotted lines.

As seen in the drawings, the carrier is provided with a hub journal block 9. The block 9 is adapted to fit the journal opening of a demountable wheel. The block 9 is held by a screw bolt 10 on a bracket 11. In the form of the invention shown in Figs. 1 and 2 of the drawings, the bracket 11 is formed from a single piece of channel bar, which is bent to form the offset face 12 and the foot 13. The foot 13 is suitably perforated to receive the bolts 14, by which the foot and connected parts thereof are secured rigidly to the running board 15 of the automobile.

To reinforce the bracket 11, a brace bar 16 is extended between and secured to the said bracket and to the frame 17 of the automobile chassis. To this end, the brace bar 16 has a square hook extremity 18. The sides of the hook extremity 18 are contracted upon the frame 17 by means of a screw bolt 19. It will be noted that the brace bar 16 extends between the body and the running board shield at the side of the automobile.

When the wheel 22 is disposed on the block 9, it is held in position by a wing nut 23, which engages the hub of the wheel 22 and holds the same rigidly on the carrier.

Figure 3:
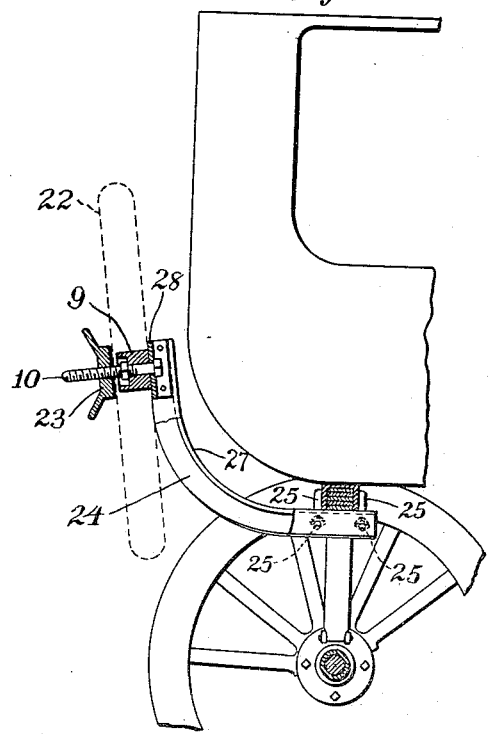
Fig. 3 is a side view of a fragment of automobile body showing a carrier for supporting a wheel at the rear of the car, the carrier being constructed and arranged in accordance with the present invention.
Figure 4:
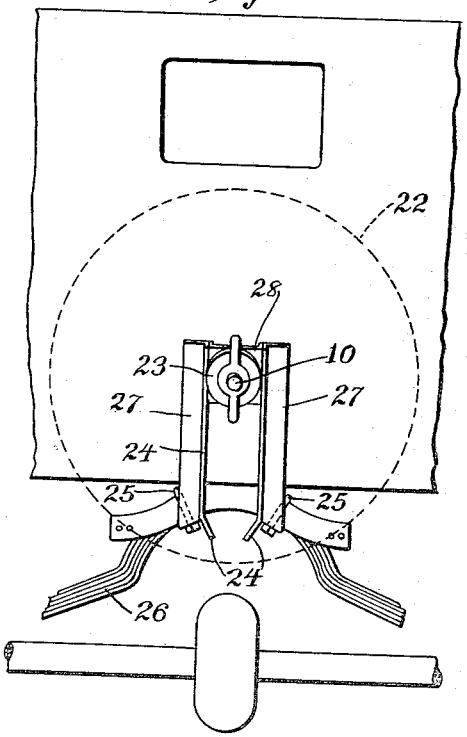
Fig. 4 is a rear elevation of the same, the carried wheel being shown by dotted lines thereon.

In Figs. 3 and 4, a modified form of carrier is shown, the modification consisting in providing in lieu of the channel iron forming the bracket 11, two side members 24 spaced apart to correspond with the disposition of the clips 25 which hold the platform spring 26 of cars of the "Ford" type. The side members 24 are preferably constructed of angle iron, the laterally extended flanges 27 whereof are perforated to receive the bolt ends of the clips 25. A spacing plate 28 unites the upper ends of the members 24, and as shown best in Fig. 3 of the drawings, also forms a support for the block 9, which is carried thereon. The block 9 is held as in the construction above described. The nut 23 is utilized in the modified form of the brackets, in the same manner as described with reference to the preferred form.

Figure 5:
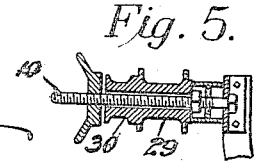
Fig. 5 is a detail view showing in section a carrier arranged to hold two wheels.

As shown in Fig. 5, a block having a spacing portion 29 and an auxiliary bearing portion 30, is used when carrying a second wheel. In this construction the bolt 10 is elongated.

*Claims.*

1. A wheel carrier comprising a standard having two side members, each constructed from angle iron, a spacing plate structurally connected with said members at the free ends thereof, and means for securing said members in service relation, said means embodying perforations formed in the outer flanges of said members, said perforations being arranged to aline with for receiving the threaded ends of the spring clips of an automobile for holding the platform spring for supporting the body of the automobile.

2. A wheel carrier comprising a standard having two side members, each constructed from angle iron, a spacing plate structurally connected with said members at the free ends thereof, and means for securing said members in service relation, said means embodying perforations formed in the outer flanges of said members, said perforations being arranged to aline with for receiving the threaded ends of the spring clips of an automobile for holding the platform spring for supporting the body of the automobile, and a journal block adapted for mounting on said spacing plate, a screw bolt extending through said spacing plate and said journal block to be held permanently on said spacing plate, the end of said screw bolt being threaded, and a wing nut engaging the threaded end of said bolt for holding the hub of a wheel on said block and against said plate.

WILLIAM FREDRICK WAHRENBERGER.